United States Patent [19]
Blen et al.

[11] Patent Number: 5,652,784
[45] Date of Patent: Jul. 29, 1997

[54] AUTOMATIC TELEPHONE ADVERTISING PROVIDED IN LIEU OF DIAL-TONE

[75] Inventors: Georgina Borbón Blen; Randolph H. Steinvorth, both of San Jose, Costa Rica

[73] Assignee: Publitel Internacional, S.A., El Dorado, Panama

[21] Appl. No.: 643,980

[22] Filed: May 7, 1996

Related U.S. Application Data

[63] Continuation of Ser. No. 249,621, May 26, 1994, abandoned.

[30] Foreign Application Priority Data

Apr. 21, 1994 [CR] Costa Rica .................. 4952

[51] Int. Cl.⁶ .................................. H04M 1/64
[52] U.S. Cl. ................. 379/67; 379/84; 379/246; 379/326; 379/399
[58] Field of Search ................ 379/67, 71, 72, 379/83, 84, 88, 89, 201, 243, 244, 245, 246, 326, 327, 399

[56] References Cited

U.S. PATENT DOCUMENTS

| | | | |
|---|---|---|---|
| 3,997,731 | 12/1976 | Wilmot et al. | 379/201 |
| 4,068,099 | 1/1978 | Mikkola et al. | 379/71 |
| 4,232,199 | 11/1980 | Boatwright et al. | 379/243 |
| 4,510,349 | 4/1985 | Segre-Amer | 379/96 |
| 4,706,270 | 11/1987 | Astegiano et al. | 379/71 |
| 4,811,382 | 3/1989 | Sleevi | 379/67 |
| 4,850,007 | 7/1989 | Marino et al. | 379/67 |
| 4,876,711 | 10/1989 | Curtin | 379/94 |

(List continued on next page.)

FOREIGN PATENT DOCUMENTS

| | | | |
|---|---|---|---|
| 892691 | 7/1982 | Belgium . | |
| 1198843 | 12/1985 | Canada | 379/374 |
| 0083893 | 12/1982 | European Pat. Off. . | |
| 245733 | 8/1911 | Germany . | |
| 5048728 | 8/1991 | Japan . | |
| 2206265 | 6/1968 | United Kingdom . | |
| 9106187 | 10/1990 | WIPO . | |

OTHER PUBLICATIONS

Tanguy et al., "Repondeur Telephonique Collectif Gaston et Machine Parlante Statique", Comm. & Transmission, vol. 5, No. 2 (France 1992).

"Serving Customers With Automatic Speech Recognition—Human Factor Issues", Wattenberger et al., AT&T Technical Journal, May/Jun. 1993, p. 36.

*Primary Examiner*—Krista M. Zele
*Assistant Examiner*—Scott L. Weaver
*Attorney, Agent, or Firm*—James Creighton Wray

[57] ABSTRACT

A telephone advertising service provides a short advertising message through a telephone receiver as a telephone call is initiated. The advertising message is stopped after a predetermined run time, and an invitation-to-dial tone is added. The advertising message is stopped when a subscriber starts to dial numbers. The method provides the advertising messages in lieu of invitation-to-dial tones. Differentiated subscribers are individually provided with distinct advertising messages. Subscribers are distinguished by characteristics of exchange number, monthly call volume, call type, geographical location and time of day. The advertising messages are provided by a message system rack connected to a digital or analog telephone exchange. Each rack has plural message recorders and plural cards connected to multiple users. Software controls a connection network. Subscriber lines are sampled to sense when a call is being initiated and to signal to a controller that a telephone call is being initiated. A PCM audio interface is activated. An available message channel is switched to the subscriber line, and a corresponding message is played over the subscriber line. Soon the subscriber line is connected to the telephone exchange, and an invitation-to-dial tone is provided. Several different messages are offered in different sets of channels, changing the messages depending on the time of day. When a prohibit service signal is active, the subscriber line is switched directly to the telephone exchange.

12 Claims, 4 Drawing Sheets

U.S. PATENT DOCUMENTS

| | | | |
|---|---|---|---|
| 4,932,042 | 6/1990 | Basal et al. | 379/67 |
| 5,007,077 | 4/1991 | Fields et al. | 379/67 |
| 5,065,424 | 11/1991 | Miller | 379/70 |
| 5,150,355 | 9/1992 | Dyer | 370/16 |
| 5,150,399 | 9/1992 | Yasuda | 379/67 |
| 5,321,740 | 6/1994 | Gregorek et al. | 379/67 |
| 5,333,186 | 7/1994 | Gupta | 379/201 |
| 5,428,670 | 6/1995 | Gregorek et al. | 379/67 |
| 5,448,625 | 9/1995 | Lederman | 379/67 |
| 5,535,264 | 7/1996 | Starr et al. | 379/89 |

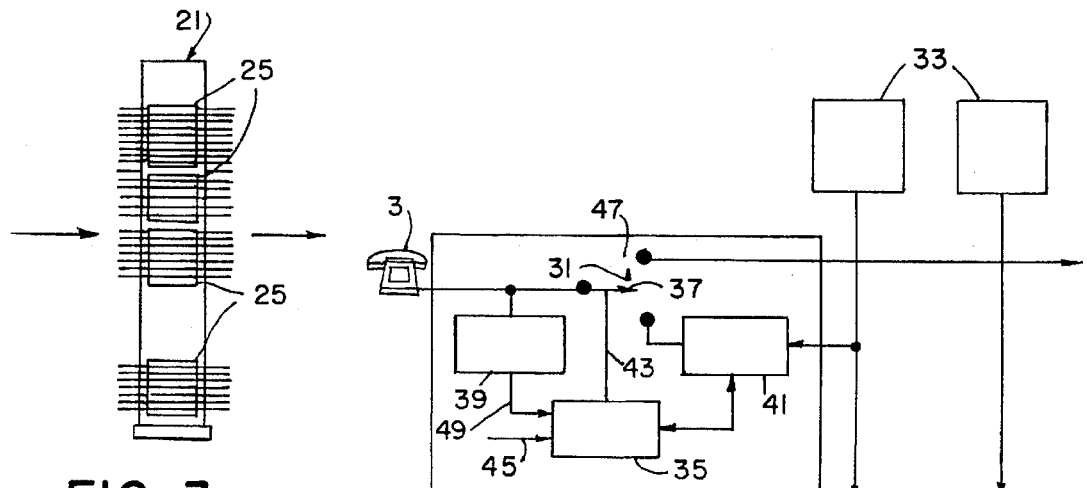
FIG. 3
FIG. 4
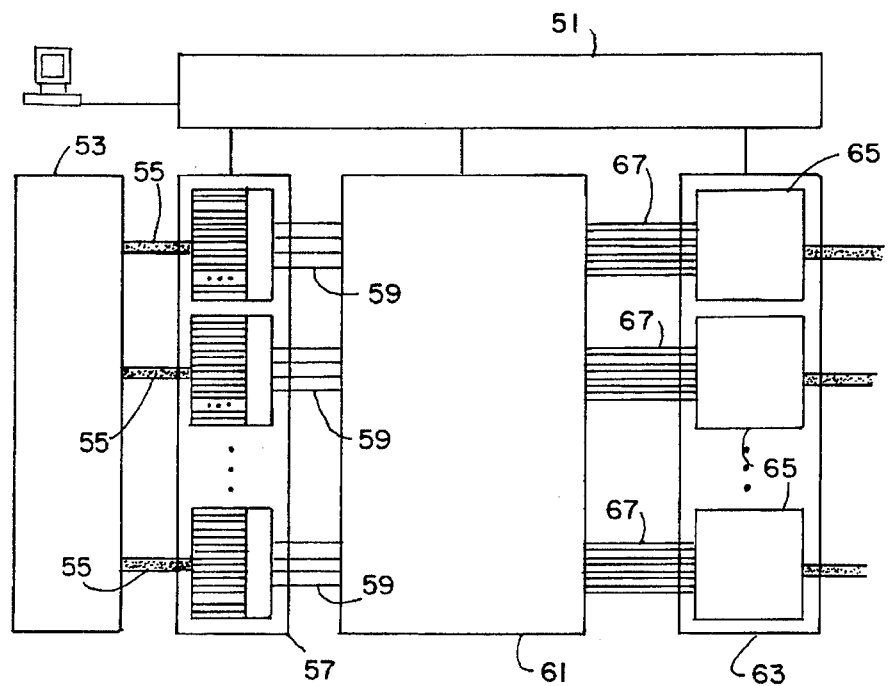
PRIOR ART
FIG. 5

| 72 | PRIVATE OR PUBLIC TELEPHONE |
| 74 | INTERNATIONAL CALLS RESTRICTION |
| 76 | CONFERENCE CALLS |
| 4 | CALL REROUTING TO AN ALTERNATE NUMBER |
| 5 | INCOMING CALL INDICATION |
| 6 | |
| 7 | ETC. |
| 8 | |

| 72 | PRIVATE OR PUBLIC TELEPHONE |
| 74 | INTERNATIONAL CALLS RESTRICTION |
| 76 | CONFERENCE CALLS |
| 4 | CALL REROUTING TO AN ALTERNATE NUMBER |
| 5 | INCOMING CALL INDICATION |
| 73 | PROTEL SERVICE |
| 7 | ETC. |
| 8 | |

| | 1993 | 1998 |
|---|---|---|
| SUBSCRIBER LINES | | |
| DIGITAL | 184,460 | 624,800 |
| ANALOG | 242,300 | 205,395 |
| MANUAL | 2,240 | — |
| | | |
| TELEPHONE EXCHANGES | | |
| DIGITAL | 41 | 119 |
| ANALOG | 113 | 96 |
| MANUAL | 14 | — |
| CONCENTRATORS | 4 | — |

AUTOMATIC TELEPHONE ADVERTISING PROVIDED IN LIEU OF DIAL-TONE

This is a continuation of Ser. No. 08/249,621, filed May 26, 1994, now abandoned.

BACKGROUND OF THE INVENTION

The implementation by interception is a solution based on hardware placed between the Main Distributor and the Telephone Exchange. Because of its location, the solution is suitable both for digital exchanges and analog exchanges as well. Despite this advantage, it is not recommended as the preferred option. The reason lies in the fact that its installation requires substantial changes in the existing infrastructure of the telephone exchange, specifically in the main distributor and the connections to the exchange. Besides, this option does not allow the implementation of the substitution of the invention-to-dial tone by the prerecorded advertisement scheme.

SUMMARY OF THE INVENTION

The implementation by programming of categories is a software type solution to a major extent. It is the preferred option because its installation is simple, and it is done at a level of modifying the main control software of the telephone exchange. Another advantage of this option is that it can implement the substitution of the invention-to-dial tone by the prerecorded advertisement scheme and it also plays the prerecorded advertisement during three seconds and then sends the invitation-to-dial tone. This scheme has the disadvantage that it is only applicable to digital exchanges. However, the world trend is to substitute analog exchanges by digital exchanges, and thus this restriction would be eliminated.

The present invention is an advertisement service that takes advantage of the first seconds of a telephone call to communicate a commercial message. Normally, when the telephone set is lifted, the subscriber awaits the invitation-to-dial tone and then dials the number of the telephone with which he desires to communicate. With the present invention, when the telephone set is lifted, a prerecorded commercial message would be heard instead of the invitation-to-dial tone. At the moment the subscriber starts to dial his number, the message disappears and the call progresses normally.

The present invention could also be offered in the following manner. When the telephone set is lifted the prerecorded message will be heard for no longer than a three second time period, then the invitation-to-dial tone will follow and from then on the subscriber would proceed with his telephone call as usual.

The present invention is capable of differentiating subscribers individually. With this capacity the present invention can establish commercial messages tailored to expected audiences. In general terms, every subscriber may be classified according to type, geographical location and time of day.

The subscriber type could correspond, in principle, to commercial or residential subscribers. However, this division could be fine tuned to allow further distinction among commercial subscribers. For example, by monthly call volume, by main activity—industry, commerce, tourism, education—etc.

The geographical location would allow the residential subscribers to be classified according to their income or fundamental activity. For example, in the rural areas it would be expected that the subscriber be related to agriculture or cattle raising.

As far as the time of day is concerned, it is convenient to distinguish the type of commercial message that will be sent and the cost of that space. For example, the advertisements during working hours could be different from those placed during non-working hours. And this, in turn, could be modified depending on the type of subscriber: commercial or residential.

The present invention does not require the subscriber's telephone set to be modified, nor the installation of any special device in the telephone set. The modification is done directly in the telephone exchanges that will provide the service, whether they are of the electromechanical type—analog—or digital type.

The present invention involves several groups of persons with complementary activities:

1. The subscribers: they are the direct recipients of this new communication means.
2. The telephone services companies: they are the ones to offer the service through their installed infrastructure.
3. The telephone equipment manufacturing companies: they are the ones to produce the equipment and the necessary programming to make the present invention available in existing or future equipment.
4. The advertising companies: they are the biggest potential customers, as the present invention could prove to be a highly selective means to place commercial messages.

The present invention would be absolutely of free choice for every subscriber. Those subscribers willing to have the present invention available with their regular telephone service, would receive a discounted rate from the telephone service company. Those who do not wish to have the present invention would continue to have the same regular telephone service and the same prevailing tariff structure that they currently enjoy. For these subscribers, the present invention would not mean any change at all.

The present invention means a new business line that would generate additional income and would allow to offer certain discounts to subscribers that receive the service.

Due to the great acceptance that the present invention is expected to have, the telephone equipment,—digital exchanges, specifically—capable of offering the service will take advantage over those unable to offer this functionality. The telephone equipment manufacturer must have an authorization or license to incorporate the present invention to his products. These products will be the selected ones by the telephone services companies because they would incorporate the necessary functionality to provide the present invention.

The present invention is a mass communication medium with a very high audience selectivity. The newspapers, the radio and the television are mass communication media but with a very low or almost nonexistent audience selectivity. Because of the massive coverage of these media, it is expected that all types of audiences will be present at certain given moments and that the chosen message for each one of them will reach its target. In the case of the present invention, the subscriber may be classified according to its type, geographical location and time of day. This allows the target markets to be determined with great precision and the commercial message to be focused in the most specific manner.

There are two basic types of telephone exchanges: the analog exchanges—also known as electromechanical—and the digital exchanges. This distinction is crucial because the implementation of the present invention depends on it. One of the two possible implementation options of the present invention offers the capability of handling both types of telephone exchanges. However, its installation cost is very high and its functionality is limited. The other option—programming of categories—allows greater functionality but is limited to digital type exchanges. This, maybe apparent constraint, is not really one, because in recent years analog exchanges have stepped back to allow exchanges of newer digital technology to step in.

The analog exchanges have a limited capacity of 10,000 subscribers as compared to the digital exchanges capable of handling up to 350,000 subscribers. The digital technology allows optimal use of the infrastructure resources at telephone exchanges and concerning transmission, which is the communication between telephone exchanges. Another advantage lies in the fact that in the digital environment, audio, video and data signal have all the same shape and this allows them to be given a common means of communication. This is known as the ISDN, which stands for Integrated Services Digital Network. The world trend is to adopt this mode of operation in a generalized manner.

In a country like Costa Rica 41% of the exchanges are digital and it is expected that by 1998 this percentage will rise to 75%. This trend is stronger in developed countries like the United States or those of the European Community. FIG. 10 shows the subscriber lines and the telephone exchanges in existence in 1993 and their projection to 1998.

These and further and other objects and features of the invention are apparent in the disclosure, which includes the above and ongoing written specification, with the claims and the drawings.

BRIEF DESCRIPTION OF THE DRAWINGS

FIG. 3 schematically shows the new rack and special mounting of subscriber cards.

FIG. 4 schematically shows function parts for the subscribers.

FIG. 5 schematically shows a typical digital telephone exchange.

DETAILED DESCRIPTION OF THE DRAWINGS

The implementation by interception of the present invention allows it to be applied to both analog exchanges and digital exchanges as well. This solution requires the installation of additional electronic equipment before the subscriber lines reach the telephone exchange. The additional equipment serves the purpose of intercepting the subscriber call and introducing the prerecorded message before the telephone exchange sends the invitation-to-dial tone. Since this equipment is installed between the telephone exchange and the subscriber, the same will work for both types of exchanges, analog and digital.

Figure 1:
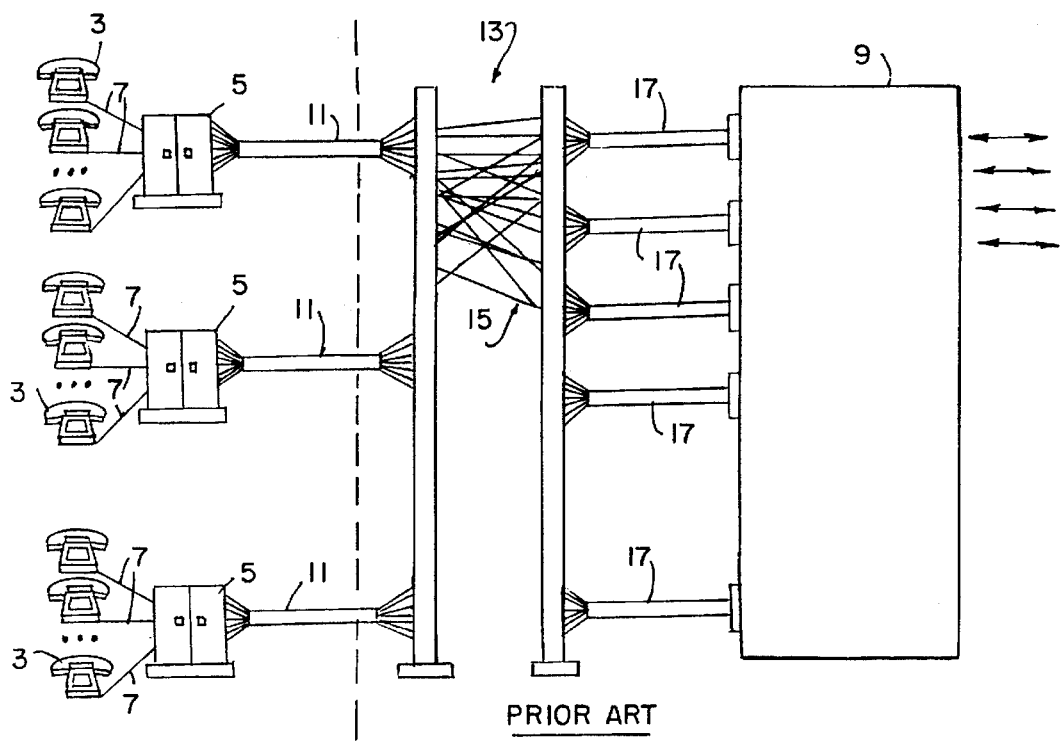
FIG. 1 schematically shows connections between subscribers and local telephone exchanges.

FIG. 1 shows the general connection scheme between subscribers and the local telephone exchanges. Each subscriber telephone 3 is connected directly to an external distributor 5 through a copper telephone twisted pair 7. The external distributors 5—normally known as cabinets—gather the subscriber twisted pairs 7 and sends them to the telephone exchanges 9 through cables 11 containing around 800 twisted pairs.

The cables 11 containing 800 twisted pairs are received at the Telephone Services Company building in the main distribution frame 13. In the main distribution frame 13, the physical twisted copper pair 7 is cross connected—distributed—to the physical twisted copper pair of the telephone exchange that corresponds to a specific telephone number. This way telephone numbers are assigned to the subscribers regardless of their physical location. When a subscriber changes his address, he may keep his current telephone number provided he remains within the same geographical area covered by the telephone exchange.

Telephone cables 17 containing between 50 and 200 subscriber twisted pairs 7 leave the main distribution frame 13. These cables 17 are connected to the telephone exchange 9, either of the analog or digital type.

What is known as a physical connection is run along the distance between the subscriber telephone set 3 and the 50 to 200 twisted copper pairs 7 on the telephone exchange side. That is, for every single subscriber there is a physical pair—a couple of copper wires—connecting his telephone set 3 to the telephone exchange 9. This differentiation, of a telephone pair per subscriber, is the key for the implementation by interception.

Figure 2:
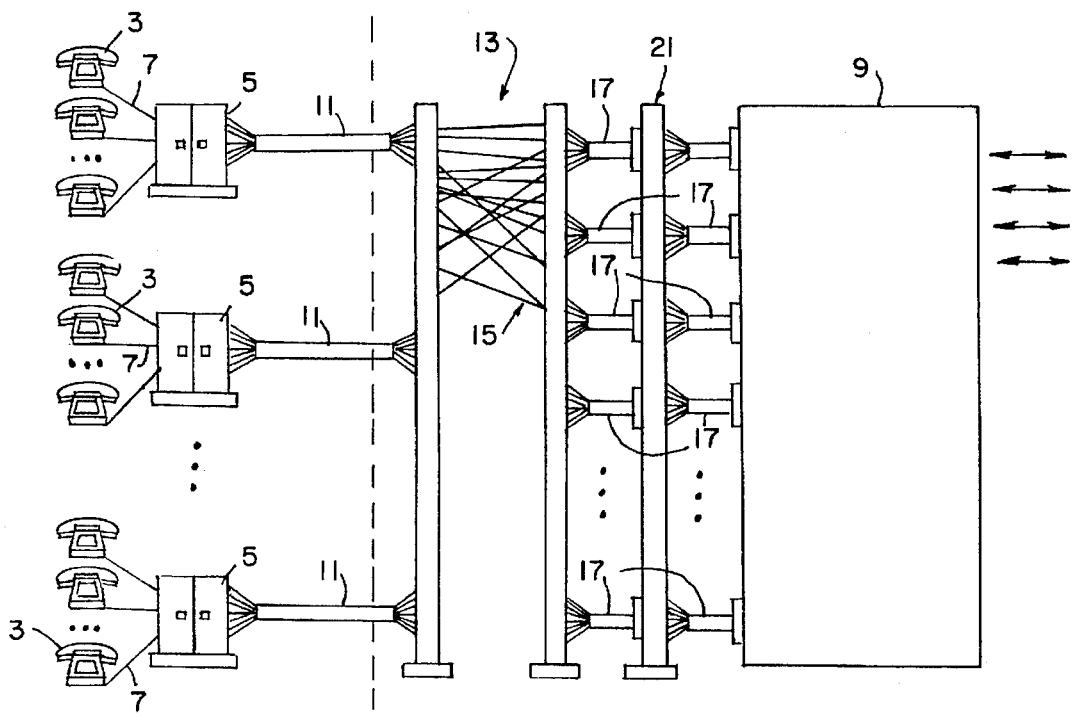
FIG. 2 schematically shows the connections of FIG. 1 with electronic equipment to incorporate the invention.

FIG. 2 shows the same scheme of FIG. 1 but with the additional electronic equipment to incorporate the present invention. In FIG. 2 a new rack 21 is shown that would have to be mounted at the exit of the main distribution frame 13 to intercept the subscriber telephone pairs before they are connected to the telephone exchange 9.

In fact, as many new racks 21 would have to be mounted as necessary to provide the service to all subscribers requesting it. Each rack 21 would contain the special subscriber cards that would allow the introduction of the present invention's commercial messages before the telephone exchange 9 sends the invitation-to-dial tone.

The location of the new rack 21, at the exit of the main distribution frame 13, is necessary for the present invention to be assigned to a specific telephone number and not to a geographical location. In this way, a subscriber moving from one address to another, within the same geographical area serviced by the telephone exchange 9, would not imply any change of state within the present invention.

FIG. 3 shows in a schematic form the new rack 21 and the mounting of the special subscriber cards 25. It is estimated that each subscriber card 25 can service between 6 and 8 subscribers. In an analog telephone exchange with a 10,000 subscribers capacity, 1250 special subscriber cards 25 would be required.

The functional parts that every subscriber line must have in order to receive the present invention is shown in FIG. 4. The schematic shown in FIG. 4 could be duplicated from 6 to 8 times on each special subscriber card 25.

The main part is the three position electronic switch 31 that connects the subscriber telephone set 3 to either the message machine 33 or the telephone exchange 9 under the sequence of a control module 35. Normally the switch 31 is in the rest position 37. This corresponds to the telephone set 3 with the head set in its rest position. When the subscriber lifts the head set the circuit is closed and the line sense module 39 will signal to the control 35 that a phone call is being initiated. The control 35 will immediately activate the PCM-audio interface 41 to search for an available message channel and makes the switch 31 move to position 43 where briefly thereafter the corresponding message will be heard. The PCM-audio interface 41 establishes the synchronization with the message machine 33 and makes the PCM to audio conversion. When the message finishes, the control 35 connects the subscriber to the telephone exchange 9 where the latter will provide the invitation-to-dial tone and the call proceeds in the usual manner.

If the subscriber has not requested the present invention, the inhibit service signal 45 will indicate so to the control 35, which in turn will move the switch 31 directly to position 47 where it will connect to the telephone exchange 9 allowing the telephone call to proceed normally.

This switch 31 must be controlled by the control module 35 to adopt one of three possible positions: rest position 37, connection to PCM-audio interface position 41, and connection to the telephone exchange position 47.

With the line sensing module 39 the condition that the subscriber has lifted his head set and is about to initiate a call is sensed. The output of this module 39 is a signal 49 to the control module 35 in order to have the message connection sequence initiated.

The inhibit service signal 45 distinguishes between those subscribers serviced by the present invention and those who are not. When this signal 45 is active the subscriber is connected directly to the telephone exchange 9. This signal 45 may be present forced by a strap or a jumper on the special subscriber card.

The PCM-audio interface 41 establishes an available route to hear the prerecorded message, converts the PCM-coded message to audio to have it listened by the subscriber, and receives the conclusion of the message signal from the message machine 33.

The route chosen by the interface 41 may be general or specific. In case of the general route, the interface 41 would simply take the first available channel to listen to the prerecorded message. In this scheme the message machine 33 could only offer a message that can change according to the time of the day. In the case of the PCM 30+2 the 30 channels of the PCM would have the same message at a given time.

In the case of the specific route, the interface 41 could have predefined straps or jumpers on the special interface card, the set of channels over which to establish the connection to listen the message. Thus, each message machine 33 could offer several different messages in different sets of channels and at the same time be able to change these messages depending on the time of the day.

The control module 35 receives the line sense signal 49, and the inhibit service signal 45 to trigger the control sequence for the switch 31 and the PCM-audio interface 41.

This module 35 would have the following major states sequence:

State 0: The controller 35 has the switch in the rest position 37 and is awaiting the line sense signal 49. If the subscriber has not lifted the head set, the controller 35 remains in this state, otherwise the transition to state 1 will take place.

State 1: The controller 35 reads the status of the inhibit service signal 45. Should it be active, then we would be dealing with a subscriber not having requested to have the present invention and the transition to state 4 will take place.

State 2: The controller 35 activates the PCM-audio interface 41 to have it search for an available channel and places the switch 31 in position 43. The transition to state 3 takes place.

State 3: The controller 35 waits for the prerecorded message transmission to finish. The transition to state 4 takes place at the end of the prerecorded message.

State 4: The controller 35 places the switch 31 in position 47 and waits for the line sense module 39 to indicate when the subscriber has hung his head set. The transition back to state 0 takes place when the subscriber hangs the head set.

There is absolutely no limitation. Every subscriber of a given telephone exchange entitled to this service may at will choose to connect or disconnect himself/herself to/from the service. The connection is done in the special subscriber card in the present invention form.

It is important to notice that this implementation of the present invention is based on the local telephone exchange, which by itself implies that there is a geographical location defined by the distribution design of the telephone service company's network. This distribution covers groups of 10,000 to 40,000 subscribers in Costa Rica and up to 350,000 subscribers in some cities in the United States. The analog telephone exchanges are normally capable of handling up to 10,000 subscribers, whereas telephone exchanges of larger capacities are of the digital type.

Within a specific telephone exchange, each subscriber may be connected to any existent message machine independently. However, since the service is tied to the telephone number and not to its location within the geographical zone, a group of telephone numbers are not necessarily located within the same geographical area serviced by the telephone exchange.

Finally, there is a limit to the amount of messages available. This depends on the message capacity of the message machine and on the number of message machines available.

The direct connection between a subscriber and the message machines allows any relation between subscriber types and message types. The only limitation, again, lies in the number of messages available in the message machines.

For message selection by hour of day, the limitation lies in the design of the message machine. However, the limitation is much lesser because it is quite simple to have the message machine change a given set of resident messages by another set of messages at a predetermined hour. This process may take place repeatedly according to a predefined schedule.

From the point of view of the present invention the number of different required messages would be the result of:

a) Number of geographical areas within the telephone exchange zone
b) Number of subscriber types per geographical area, and
c) Number of periods in a day per subscriber type.

From the point of view of the design presented the maximum number of available messages would depend on:

a) The number of available message machines in the telephone exchange
b) The number of channel groups to which a different message could be assigned per message machine, and c) The number of different periods that may be programmed during the day for each group of channels.

Both points of view have to be balanced to adequately meet the advertisement requirements with the required infrastructure at the telephone exchange.

The installation of the racks requires physical space in the building where the telephone exchange is located, specifically in the main distributor frame's site. The installation includes not only the racks, but also the special subscriber cards and their respective wiring. The installation is very labor intensive as every single subscriber line arriving there will require hand made connections.

These special subscriber cards would have an average cost around $100 according to information requested in this sense and stating the basic requirements. In the case of a telephone exchange servicing 10,000 subscribers, 1250 cards would be required yielding a total cost of around $125,000.

The number of message machines that are required for a given telephone exchange will depend on the needs from the advertisement point of view, the restrictions on the amount of different messages that the message machine may handle and the traffic requirements to prevent the present invention of becoming a bottle neck. The cost of a message system is around $42,000 in its basic version.

Once the present invention has been installed in a telephone exchange, maintenance of the present invention would involve two main activities: maintenance of the messages and maintenance of the subscribers.

The maintenance of the messages would consist in recording the messages in digital form and introducing them in the message machines according to the marketing needs. This operation would be as simple as introducing a diskette into a computer, once the message is in a digital medium.

The maintenance of the subscribers would consist in drawing new subscribers to the present invention and removing the service from those who no longer desire to have it and changes in the subscriber type to allow the reception of a new set of different messages. These actions require manual intervention in the connections that are made in the racks and in the straps or jumpers installed in the special subscriber cards.

FIG. 5 shows in a schematic form a typical digital telephone exchange. One of the most important differences in the way a digital telephone exchange is built is in the way control of the same is done. All actions in a digital telephone exchange are controlled by a stored program. This scheme is known as stored program control 51. The flexibility that this control scheme 51 provides is the greatest advantage to include a new service in the telephone exchange, this of course, is certainly true for the present invention. The main software of the telephone exchange controls all parts of the exchange: the subscriber phase, the group selector and the trunks.

On the left side of FIG. 5 we find the main distributor 53, which was introduced earlier with greater detail in FIG. 1. At the exit of the main distributor 53 telephone pairs 55 are taken in groups of 1024 to feed what is known as the subscriber phase 57 or line phase. In the subscriber phase 57 the individual subscriber lines are taken and their audio signals are converted to PCM type signals. While being as PCM, several subscriber signals may be combined to be transmitted through a single wire. In the American primary DS-1 signal standard, 24 subscriber signals may be combined in a single physical wire. The European standard established by the CCITT allows 30 subscriber signals to be coded in the same physical wire.

Using European PCM 30 standard, the subscriber phase 57 of FIG. 5 would be taking 1024 subscribers to share four PCM lines 59. Since each line 59 has 30 channels, then the 1024 subscribers would have to share 120 PCM channels. This situation has to be taken into account as part of the traffic design when installing a telephone exchange. In this hypothetical case it is being assumed that at a given moment of use during the peak utilization hour, only 120 out of the 1024 subscribers will be talking at the same time and that the average duration of his call is such that in the moment that one subscriber hangs his headset a new one is about to initiate a call.

The subscriber phase 57 will also register the number the subscriber dialed to establish the path the call must follow to reach its destination. This path is determined by the main software of the telephone exchange and the necessary connections in the group selector 61 are established.

The group selector 61 takes the subscriber's call and directs it to its final destination according to the path established by the main software 51. If it is a local call for the service zone of the telephone exchange, then the connection is returned to the subscriber phase 57 to have it go to the corresponding subscriber line. If the line is not busy the telephone exchange will produce the ring signal making the destination subscriber aware of the new call.

If the call is intended for a telephone number that does not belong to the service zone of the given telephone exchange, the main software 51 determines the necessary path through a trunk 63 so the call can reach its destination. The call then exits this telephone exchange to enter another one that serves the area where the destination telephone number is located. In this other telephone exchange the group selector 61 establishes the corresponding path to ring the line of the subscriber being sought.

Each trunk card 65 receives from four to eight PCM lines 67 and transmits its contents to another telephone exchange. The traffic considerations are greater here since it involves the communication needs of all the subscribers of the local zone with those of another location.

Figures 6, 7:
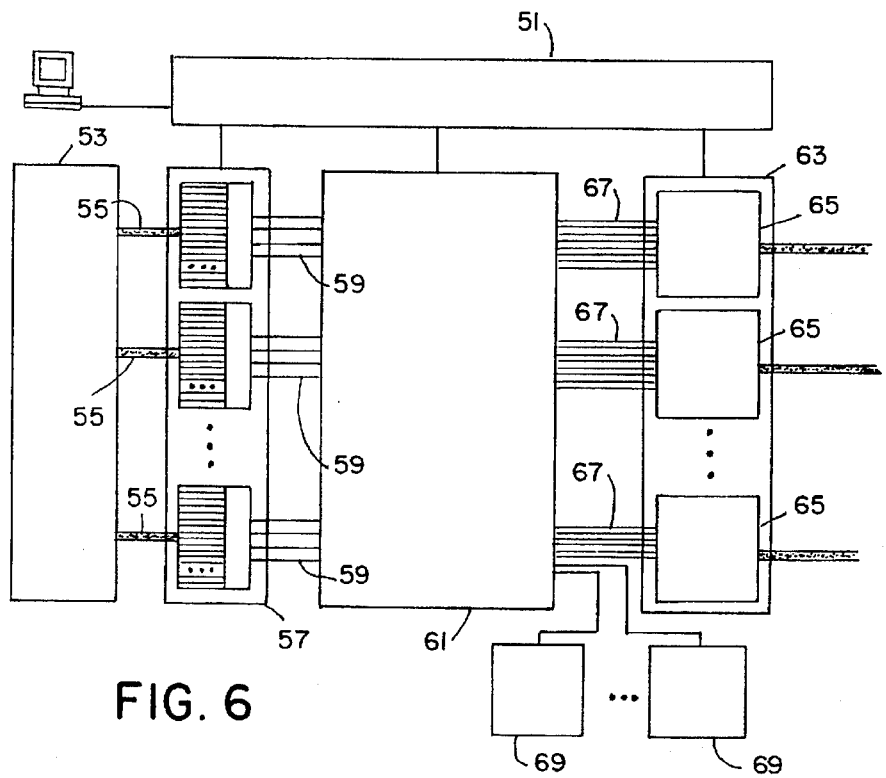
FIG. 6 schematically shows message machines connected to the exchange of FIG. 5.
FIG. 7 is a table of categories of telephone calls.

The path definition performed by the main software 51 is a key element in having the present invention included in digital telephone exchanges. One or several message machines 69 may be connected to the PCM lines 67 that go to the trunks 63 as shown in FIG. 6.

When a telephone subscriber who is a present invention user lifts his headset, this condition is sensed in the subscriber phase 57 and made known to the main software 51 of the telephone exchange. The main software 51 "knows" that the subscriber is a present invention user by means of the categories mechanism used in every digital telephone exchange. Since the subscriber has a present invention user category, the main software 51 of the telephone exchange will establish a path to the PCM channel(s) 67 connected to the message machines(s) 69. The message machine 69 senses the take over, answers the call and sends the message.

Depending on the variation used, the message substitutes the invitation-to-dial tone or precedes the emission of the invitation-to-dial tone. In the first case, once the subscriber has dialed the first digit, the message will be interrupted and the call will proceed as usual. In the second case, the message remains during three seconds, concludes, the telephone exchange sends the invitation-to-dial tone and the call proceeds as usual.

The message machine connection at the trunks level of a telephone exchange and the control to provide the present invention by the main software, render the installation and maintenance much simpler and cheaper.

It is not necessary to add new racks or special subscriber cards to install the present invention, and the maintenance of the subscribers may be done from any control terminal of the telephone exchange.

All digital exchanges use a system of categories 71 to identify the condition of each subscriber and to determine the services he has right to. The categories 71 of a subscriber are stored in the memory of the telephone exchange, where they are accessed by the main software 51. The categories 71 of a subscriber could be represented schematically as shown in the table of FIG. 7.

The example of FIG. 7 shows a fictitious table of categories 71 that does not correspond to any particular digital telephone exchange, but does serve the purpose to illustrate the point. The category 72 allows the telephone exchange to differentiate whether the subscriber is a private telephone number or a public one. The category 74 would indicate whether this subscriber has any restriction to make international calls. The category 76 would allow the subscriber to establish a conference call with two or more other subscribers. The telephone exchange consults the table of categories 71 to verify whether the service being requested by a subscriber may be completed or not.

Figures 8, 9, 10:
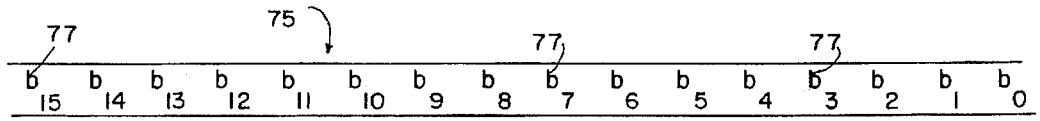
FIG. 8 is a table of categories of telephone calls which includes the new invention.
FIG. 9 schematically shows a bit structure of the new invention in calls.
FIG. 10 is a table showing subscriber lines and telephone exchanges in existence in 1993 and the projected numbers for 1998, for Costa Rica.

To include the present invention it would be required to define one or more categories 71 recognizable by the main software 51 of the telephone exchange to connect the corresponding message machine 69 at the appropriate moment. FIG. 8 shows a situation where the present invention would be included.

At the same time, each category is represented by a set 77 of bits 77. Each bit 77 of the category 71 may be used to indicate a particular situation of the category 71. For example, if the service is available or not. In the case of the present invention, each bit 77 could serve to identify different subscriber types within a given category.

If it is assumed that each category 71 contains 16 bits, then we could think of the present invention category having the structure of FIG. 9.

The description given next to each bit 77 in FIG. 9 is a suggestion that may be revised and fine tuned in a later design phase. The purpose of the description is to provide an idea of the functionality being sought with this type of implementation. For example, each bit of the category could be used in the following manner:

b15: The category is active or not. Should it be active we would have a subscriber who is a user of the present invention.

b14: The variation of the present invention that would be used with the subscriber. One is to substitute the invitation-to-dial tone with the prerecorded message. The other one is to connect the prerecorded message for three seconds and then establish the invitation-to-dial tone.

b13 and b12: Could be used to establish whether the present invention is 100%, 75% or 25% of the day active. 75% would imply that out of every four calls attended by the telephone exchange three would be serviced by the present invention.

b11 to b0: Other combinations may be assigned in which it would be specified whether the subscriber is of the residential or commercial type. The type of activity he is engaged in: commerce, local industry, exports, tourism, education, etc. Specifying different geographical areas within the zone covered by the telephone exchange could be considered, with the restrictions we have already stated.

In order to offer the present invention to the subscribers, it is possible that certain modifications to the main software that controls the telephone exchange be required. The extent to which the main software may require to be modified depends entirely on the functionality currently installed in the telephone exchanges. However, since the suggested implementation conforms to the current mode of operation of the categories, it is estimated before hand that these modifications will not represent any major programming changes in the existing main software.

Specifically, the main software must be modified to perform the following tasks:

1. Check the subscriber's table of categories to verify whether he is entitled to the present invention or not.

2. Determine the service variation to be provided to the subscriber, should he be entitled to the same: substitution of the invitation-to-dial tone with the prerecorded message or the sequence consisting of the three second message followed by the invitation-to-dial tone.

3. Establish a path to the message machines depending on the bit pattern of the corresponding category which defines the subscriber type and other attributes, see FIG. 9 and its respective explanation. For example, if the subscriber is residential with an occupation in tourism, a path would be established to the PCM channels corresponding to the message machine containing the specific message for that type of subscriber.

4. Continue with the normal call sequence once the present invention has been rendered.

The maintenance of the subscribers would consist in drawing new subscribers to the PROTEL SERVICE and removing the service from those who no longer desire to have it and performing changes in the subscriber type to allow the reception of a new set of different messages. These actions would be performed through one of the digital telephone exchange control terminals. The corresponding bit patterns of the respective subscriber categories belonging to the PROTEL SERVICE would be changed there.

Each message machine will allow the availability of a set of messages for one or more subscriber types. Should it be necessary to identify four or eight different types of subscribers, then four or eight separate message sets will be required. These messages could reside in one same message machine or in several. The decision lies on the traffic needing to be serviced. Having considered this, every group of subscribers is warranted a prompt service by the present invention with no risk of the same becoming a bottle neck to place a call.

The message machine is a device capable of storing digitally prerecorded messages and offering them through PCM channels according to the DS-1 American Standard of 24 channels or the 30 channels European one of the CCITT.

For the specific case of the implementation by interception of the present invention, it is not necessary to use any of these two standards specifically, since its operation is independent of the telephone exchange type. Only the compatibility with the special subscriber cards has to be guaranteed.

In the implementation by programming of categories it is of utmost importance that the PCM standard of the message machine coincide with that of the telephone exchange.

The CBT 16000 or the TAPCM-120 systems manufactured by the firm CIBERTEC S.A. are similar to what would be required for any of both implementations. However, their current construction is actually based on the European CCITT standard.

In any case, the message machine should have the following features to provide the functionality required by the present invention:

1. It should conform to the DS-1 signal American Standard or to the European PCM 30+2 Standard of the CCITT.
2. The message contained in the message machine should be easily changeable with new messages, in order to satisfy the needs of the advertising companies. The messages could be recorded in any private studio using microcomputer-based multimedia technology. The digitalized information could be transferred to the message machines by means of diskettes.
3. The message machine must be capable of changing the message according to the hour of the day. For example, the day could be divided into four mutually exclusive periods, whose starting and finishing time could be programmed afterwards. This way each message machine would have four different messages assigned to it according to the period of the day. Thus, when a subscriber lifts his head set at a certain given time of the day. The message he would listen to would be the one corresponding to the period of the day for that particular hour.
4. The message machine should be able to assign messages to different groups of PCM channels. For example, in the case of the PCM 30+2 the 30 PCM channels could be divided into three different messages each one of them utilizing five channels, or any other convenient distribution according to the estimated traffic travel. With any division of channels and messages chosen there would be always the capacity to change the advertisement depending on the time of the day. Continuing with the examples of the prior and present paragraph, there would be a total of twelve messages. Three groups of five channels each and each group of channels with messages for four different periods during the day.
5. The message machine must be capable of storing messages with 3 to 5 seconds duration.
6. The message machine must provide the means to have the subscriber begin listening to the message with the least possible delay. It is estimated that this delay may not exceed one second.

While the invention has been described with reference to specific embodiments, modifications and variations of the invention may be constructed without departing from the scope of the invention, which is defined in the following claims.

I claim:

1. A telephone advertising service method, comprising providing an advertising message from a message machine in a message system connected to a telephone receiver as a telephone call is initiated by a subscriber lifting a handset off-hook, further comprising sensing a subscriber line condition to sense when the telephone handset is off-hook, signalling the off-hook condition to a controller, activating a pulse code modulated (PCM) audio interface with the controller, searching for an available message channel from the message machine, and switching the message channel from the message machine to the subscriber line and playing the advertising message from the message machine over the subscriber line, ending the advertising message, disconnecting the subscriber line from the message channel, and connecting the subscriber line to a telephone exchange and providing a dial tone to the subscriber line.

2. The method of claim 1, wherein the advertising message is selected from a collection of several different advertising messages in different sets of message channels, and further comprising changing the collection of advertising messages, the changing of the collection of advertising messages being dependent on a time of day when the call is being initiated.

3. The method of claim 1, further comprising prior to the searching step providing an inhibit service signal to the controller when a subscriber elects not to receive the advertising message, sensing whether the inhibit service signal is present when the subscriber line is off-hook, and providing the connecting of the subscriber line to the telephone exchange with the controller when the inhibit service signal is sensed as active and the subscriber line is off-hook.

4. A telephone advertising service method, comprising providing an advertising message from a message machine in a message system connected to a telephone receiver as a telephone call is initiated on a subscriber line by lifting a handset off-hook, further comprising sensing a subscriber line off-hook signal from the subscriber line, sensing for presence of an inhibit service signal related to the subscriber line, activating a message system upon sensing the subscriber line off-hook signal and sensing no presence of the inhibit service signal, connecting the subscriber line to a telephone exchange upon concurrently sensing the subscriber line off-hook signal and the presence of the inhibit service signal related to the subscriber line, wherein the activating the message system comprises activating a pulse code modulated audio interface upon sensing the subscriber line off-hook signal and no presence of the inhibit service signal, delivering a prerecorded advertising message on the subscriber line, ending the advertising message and subsequently connecting the subscriber line to the telephone exchange.

5. Telephone direct advertising apparatus, comprising a telephone exchange having connections to telephone trunks and having connections to a main distribution frame, and having cross-connections in the main distribution frame between site numbers and subscriber numbers, a plurality of cables connected to the main distribution frame and a plurality of distributors individually connected to the cables, multiple subscriber lines connected to each of the distributors and multiple subscriber sets connected individually to the subscriber lines, and advertising message machines connected to the telephone exchange for delivering advertising messages through the subscriber lines to the subscriber sets, plural special subscriber cards mounted in a message system rack and connected between the telephone exchange and the main distribution frame, and wherein the message machines are connected to the message system rack, wherein the cards comprise connections to the multiple subscriber lines, line sensors connected to the subscriber lines for sensing change from on-hook to off-hook conditions of the subscriber lines, controls connected to the line sensors, PCM-audio interfaces connected to the controls and connected to at least one of the message machines, exchange lines connected to the cards and to the telephone exchange, and switches connected to and controlled by the controls for switching the subscriber lines from the exchange lines to the interfaces in response to sensing off-hook conditions in the subscriber lines.

6. Telephone advertising message service apparatus, comprising a digital telephone exchange comprising a trunk connector having plural trunk cards connected to pulse code modulated (PCM) trunks to other exchanges, plural PCM lines connected to each trunk card, a connection network having a trunk side and a subscriber side, the trunk side connected to the plural PCM lines, plural digital lines connected to the subscriber side of the connection network, a subscriber phase having plural subscriber phase cards connected to the plural digital lines, analog cables connected to the subscriber phase cards, a main distribution frame connected to the analog cables, and subscriber lines and subscriber sets connected to the main distribution frame, a stored program control connected to the trunk cards, to the connection network and to the subscriber phase cards for providing connection of the subscriber lines to other subscriber lines or to PCM trunks to other exchanges through the connection network, and advertising message machines connected to the connection network for supplying advertising messages via the connection network, the digital lines, the subscriber phase cards and the main distribution frame to the subscriber lines, means for connecting the telephone exchange to one of the message machines, means for selecting an advertising message based on a characteristic, the characteristic selected from a group consisting of time of day, a subscriber type, and a geographical location, means for delivering the advertising message from the message machine to the telephone exchange, and means for terminating the advertising message when the subscriber begins dialing a number.

7. Telephone advertising message service apparatus, comprising a digital telephone exchange comprising a trunk connector having plural trunk cards connected to pulse code modulated (PCM) trunks to other exchanges, plural PCM lines connected to each trunk card, a connection network having a trunk side and a subscriber side, the trunk side connected to the plural PCM lines, plural digital lines connected to the subscriber side of the connection network, a subscriber phase having plural subscriber phase cards connected to the plural digital lines, analog cables connected to the subscriber phase cards, a main distribution frame connected to the analog cables, and subscriber lines and subscriber sets connected to the main distribution frame, a stored program control connected to the trunk cards, to the connection network and to the subscriber phase cards for providing connection of the subscriber lines to other subscriber lines or to PCM trunks to other exchanges through the connection network, and advertising message machines connected to the connection network for supplying advertising messages via the connection network, the digital lines, the subscriber phase cards and the main distribution frame to the subscriber lines, further comprising means for assigning categories of service to a subscriber line in the stored program control of the digital telephone exchange, means for connecting the subscriber line to the digital telephone exchange by the subscriber line going off-hook, means for detecting the off-hook condition of the subscriber line, means for checking with the stored program control the categories of service assigned to the subscriber line, means for verifying in the categories of service that the subscriber line has requested the telephone advertising service, means for selecting the advertising message based on a characteristic being when the telephone advertising service has been requested, the characteristic encoded within categories of service of the subscriber and means for selecting a particular advertising message based on characteristics of time of day, a subscriber type, and a geographical location, means for connecting the subscriber line to one of the message machines based on the selected characteristic, means for delivering the selected advertising message from the message machine to the subscriber line, means for delivering dial tone to the subscriber line when the advertising message has ended, and means for accepting a subscriber dialed number, and proceeding with a telephone call in response to the dialed number.

8. A telephone advertising service method comprising assigning categories of service to a subscriber, connecting a telephone of the subscriber to a telephone exchange by a subscriber line, initiating a call by lifting a headset of the telephone from the telephone, detecting the lifting of the headset, checking the categories of service assigned to the subscriber, connecting the telephone exchange to at least one message machine, selecting a message based on a characteristic of the categories of service, the characteristic selected from a group consisting of time of day, a subscriber type, and a geographical location, and delivering the message from the message machine to the telephone exchange, further comprising terminating the message when the subscriber begins dialing a number.

9. Telephone direct advertising apparatus, comprising at least one subscriber telephone, a distributor connected to the telephone by a copper telephone twisted pair carrying a subscriber line, a main distribution frame connected to the distributor by a cable, the cable carrying the twisted pair, a telephone exchange pair positioned in the main distribution frame and cross-connected to the twisted pair, a message system rack having additional subscriber cards and message machines connected to the subscriber cards connected to the main distribution frame by first connections, one of the first connections carrying the twisted pair, and a telephone exchange connected to the subscriber cards on the message system rack by second connections, one of the second connections carrying the twisted pair, and wherein each subscriber card on the message system rack connects to a corresponding twisted pair carrying the subscriber line before the twisted pair is connected to the telephone exchange and delivers an advertising message from a message machine to the subscriber line, means for detecting an off-book condition of the telephone, means for checking categories of service assigned to the subscriber line, means for connecting the telephone exchange to at least one message machine, means for selecting the message based on a characteristic of the categories of service, the characteristic selected from a group consisting of time of day, a subscriber type, and a geographical location, means for delivering the message from the message machine to the telephone exchange, and means for terminating the message when the subscriber begins dialing a number.

10. Telephone direct advertising apparatus, comprising at least one subscriber telephone, a distributor connected to the telephone by a copper telephone twisted pair subscriber line, a main distribution frame connected to the distributor by a cable, the cable carrying the twisted pair, a telephone exchange pair positioned in the main distribution frame and cross-connected to the twisted pair, a special subscriber card mounted on a message system rack and connected to the main distribution frame by first connections, one of the first connections connected to the twisted pair, and a telephone exchange connected to the special subscriber card on the message system rack by second connections, one of the second connections connected to the twisted pair, and wherein the special subscriber card on the message system rack is connected between the first connections and the second connections and wherein the second connections are connected to the telephone exchange and message machines connected to the special subscriber card for delivering an advertising message to the subscriber line, wherein the special subscriber card further comprises a three position electronic switch, a control module for controlling the switch and positioning the switch in a rest position, a pulse code modulated (PCM)-audio position, or a telephone exchange position, a line sense module for detecting when a subscriber lifts a headset of a telephone and for delivering sense signal to the control module, and a PCM-audio interface connected to the control module, the PCM-audio interface being activated by the control module when the line sense module delivers the sense signal to the control module, and wherein the PCM-audio interface is connected to the message machines.

11. The apparatus of claim 10, further comprising a means for providing an inhibit service signal to the control module and for delivering the inhibit service signal to the control module to move the switch to the telephone exchange position when the inhibit service signal is valid because a subscriber has elected not to receive an advertising message from the message machines.

12. An advertising message service apparatus comprising a trunk connector, multiple trunk cards connected to the trunk connector and to other telephone exchanges, a connection network connected to the trunk cards by multiple pulse code modulated (PCM) lines, a sUbscriber'side and multiple subscriber phase, the subscriber side cards connected to the connection network by digital lines, a main distributor connected to the subscriber side by analog cables, a telephone set connected to the main distributor by subscriber lines, message machines for playing advertising messages, a controller connected to the connection network, to the trunk connector, to the message machines and to the subscriber side for controlling initiation and delivering of advertising messages, and the message machines connected to the connection network for delivering the advertising messages to the telephone via the subscriber lines, means for detecting an off-hook condition of the telephone, means for checking the categories of service assigned to the subscriber line, means for connecting the telephone exchange to at least one message machine, means for selecting the message based on a characteristic of the categories of service, the characteristic selected from a group consisting of time of day, a subscriber type, and a geographical location, means for delivering the message from the message machine to the telephone exchange, and means for terminating the message when the subscriber begins dialing a number.

* * * * *